US008511351B2

(12) United States Patent
Watkins et al.

(10) Patent No.: US 8,511,351 B2

(45) Date of Patent: Aug. 20, 2013

(54) SYSTEM AND METHOD FOR DISTRIBUTING FUEL FROM A HYDRANT PIT VALVE AT AN AIRPORT

(75) Inventors: Owen Watkins, East Fallowfield, PA (US); Edward A. Sell, West Chester, PA (US)

(73) Assignee: General Transervice, Inc., Coatesville, PA (US)

( * ) Notice: Subject to any disclaimer, the term of this patent is extended or adjusted under 35 U.S.C. 154(b) by 154 days.

(21) Appl. No.: 13/072,216

(22) Filed: Mar. 25, 2011

(65) Prior Publication Data

US 2011/0232801 A1 Sep. 29, 2011

Related U.S. Application Data

(60) Provisional application No. 61/317,802, filed on Mar. 26, 2010.

(51) Int. Cl.
*B64F 1/28* (2006.01)
*B65B 1/04* (2006.01)
*B60P 3/22* (2006.01)

(52) U.S. Cl.
USPC ................ 141/231; 141/2; 141/95; 141/192; 137/351

(58) Field of Classification Search
USPC .............. 141/1, 2, 67, 95, 99, 197, 198, 231, 141/301, 302, 304, 305; 137/355.12, 565.13, 137/565.17, 581, 624.27, 625, 899; 244/135 R, 244/135 A See application file for complete search history.

(56) References Cited

U.S. PATENT DOCUMENTS

| | | | | |
|---|---|---|---|---|
| 2,948,306 | A * | 8/1960 | Kuraeff | 141/231 |
| 2,960,106 | A * | 11/1960 | Dyer et al. | 137/351 |
| 3,591,050 | A * | 7/1971 | Kupersmith et al. | 222/23 |
| 3,648,720 | A * | 3/1972 | Kornahrens | 137/351 |
| 3,800,736 | A * | 4/1974 | Krohn | 116/268 |
| 4,886,282 | A * | 12/1989 | Wilkinson et al. | 280/4 |
| 5,305,805 | A | 4/1994 | Watkins, Jr. | |
| 6,082,392 | A | 7/2000 | Watkins, Jr. | |
| 6,213,515 | B1 | 4/2001 | La Terra | |
| 6,324,840 | B1 | 12/2001 | Watkins | |
| 6,360,730 | B1 * | 3/2002 | Koethe | 123/541 |
| 7,055,546 | B2 * | 6/2006 | McLaughlin et al. | 137/487.5 |
| 7,327,045 | B2 | 2/2008 | Watkins | |

* cited by examiner

*Primary Examiner* — Timothy L Maust
*Assistant Examiner* — Robert Bell, III
(74) *Attorney, Agent, or Firm* — RatnerPrestia

(57) ABSTRACT

A fuel delivery system of an aircraft refueling vehicle that is configured to distribute fuel from a hydrant pit valve at an airport. The fuel delivery system includes a first hose including a coupler that is configured to be fluidly connected to a hydrant pit valve at an airport to receive fuel from the hydrant pit valve. A fuel passageway is fluidly coupled to the first hose. An on-board fuel tank is fluidly coupled to the fuel passageway. A second hose is fluidly coupled to the fuel passageway. The second hose includes a nozzle that is configured to be coupled to a refueling point on an aircraft to distribute fuel into a fuel tank of an aircraft. A valve is coupled to the fuel passageway to control the flow of fuel to and from the aircraft refueling vehicle.

14 Claims, 3 Drawing Sheets

11
84
70B
40-1
70D
40-2
70A
80
82
70C
20
64
58C
58B
58D
58A
56
54
40-3
60
62
40-5
52
12
53
40-4
51
17
18
16
96
20
24
17
36
34
30
40
38
32
27
22
40-6

SYSTEM AND METHOD FOR DISTRIBUTING FUEL FROM A HYDRANT PIT VALVE AT AN AIRPORT

CROSS-REFERENCE TO RELATED APPLICATION

This application claims priority to U.S. Provisional Patent Application No. 61/317,802, filed Mar. 26, 2010, the contents of which are incorporated by reference.

FIELD OF THE INVENTION

The invention relates to a method for distributing fuel from a hydrant pit valve at an airport directly to an aircraft, a method for delivering fuel from a hydrant pit valve to a fuel storage tank of a fuel truck, and a system for carrying out those methods.

BACKGROUND OF THE INVENTION

Most airports have dedicated oil depots (usually called "fuel farms") where aviation fuel (Jet A or 100LL, for example) is stored prior to being discharged into aircraft fuel tanks. Fuel is transported from the oil depot to the aircraft either by a fuel truck having an on-board fuel tank (which is also known as a road tanker or a refueler) or via a fuel hydrant system that transports the fuel from the oil depot to a fueling apron of an airport. The fuel hydrant system includes one or more hydrant pit valves that are located on the fueling apron of an airport. Fuel in the fuel storage tanks of the oil depot can be accessed via the hydrant pit valves.

In one scenario employing a fuel truck having an on-board fuel tank, an operator drives a fuel truck to the oil depot, fills the on-board fuel tank of the fuel truck with fuel from the oil depot fuel storage tank, drives to the aircraft, connects a hose to a fueling point on the aircraft, and distributes the fuel through the hose and into the fuel tank of the aircraft utilizing an onboard pump for pressure. Fuel trucks are sold by GENERAL TRANSERVICE, INC. of Coatesville, Pa., USA.

In a second scenario employing a hydrant servicer (i.e., a vehicle which does not include an on-board fuel tank), an operator drives the hydrant servicer to an aircraft, connects one end of a hose of the hydrant servicer to a hydrant pit valve and the other end of the hose to a fueling point on the aircraft, and distributes the fuel through the hose and into the fuel tank of the aircraft utilizing pressure from the hydrant system. Hydrant servicers (which are also known as hydrant carts) are sold by GENERAL TRANSERVICE, INC. of Coatesville, Pa., USA. A hydrant servicer is disclosed in U.S. Pat. Nos. 5,305,805 to Watkins Jr. and 6,213,515 to La Terra, for example.

When filled at an oil depot, the fuel truck has internal overfill protection to prevent overfilling of a fuel tank of the fuel truck. In contrast, a hydrant pit valve has no such provisions. For at least that reason, most fuel trucks are not designed to transfer fuel from a hydrant pit valve to an aircraft.

Disclosed hereinafter is a hydrant servicer that is capable of receiving fuel from a hydrant pit valve and distributing fuel from the hydrant pit valve to the fueling point on the aircraft. U.S. Patent App. No. 61/242,435 to Watkins and U.S. Pat. Nos. 6,082,392, 6,324,840 and 7,327,045 to Watkins are each incorporated herein by reference in their entirety.

SUMMARY OF THE INVENTION

According to one aspect of the invention, a fuel delivery system of an aircraft refueling vehicle that is configured to distribute fuel from a hydrant pit valve at an airport is provided. The fuel delivery system includes a first hose including a coupler that is configured to be fluidly connected to a hydrant pit valve at an airport to receive fuel from the hydrant pit valve. A fuel passageway is fluidly coupled to the first hose. An on-board fuel tank is fluidly coupled to the fuel passageway. A second hose is fluidly coupled to the fuel passageway. The second hose includes a nozzle that is configured to be coupled to a refueling point on an aircraft to distribute fuel into a fuel tank of an aircraft. A valve is coupled to the fuel passageway that is moveable between a first position and a second position. In the first position of the valve, the fuel passageway is configured to distribute fuel from the first hose to the on-board fuel tank of the aircraft refueling vehicle, and, in the second position of the valve, the fuel passageway is configured to distribute fuel from the first hose to the second hose of the aircraft refueling vehicle.

According to another aspect of the invention, a method of distributing fuel from a hydrant pit valve at an airport to a fuel tank of an aircraft using a fuel delivery system of an aircraft refueling vehicle is provided. The method comprises the step of fluidly connecting a first hose of the aircraft refueling vehicle to the hydrant pit valve to receive fuel from the hydrant pit valve and deliver the fuel into a fuel passageway of the fuel delivery system. A second hose is fluidly connected to a refueling point on an aircraft, wherein the second hose is fluidly connected to the fuel passageway to receive fuel from the fuel passageway. An impeller of a fuel pump, which is configured to deliver fuel through the second hose, is disengaged such that the fuel pump operates in a freewheel mode. Fuel is distributed into the first hose, through the fuel passageway and the second hose and into the refueling point on the aircraft.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

In the figures, identical item numbers in different figures refer to identical components.

Figure 1:
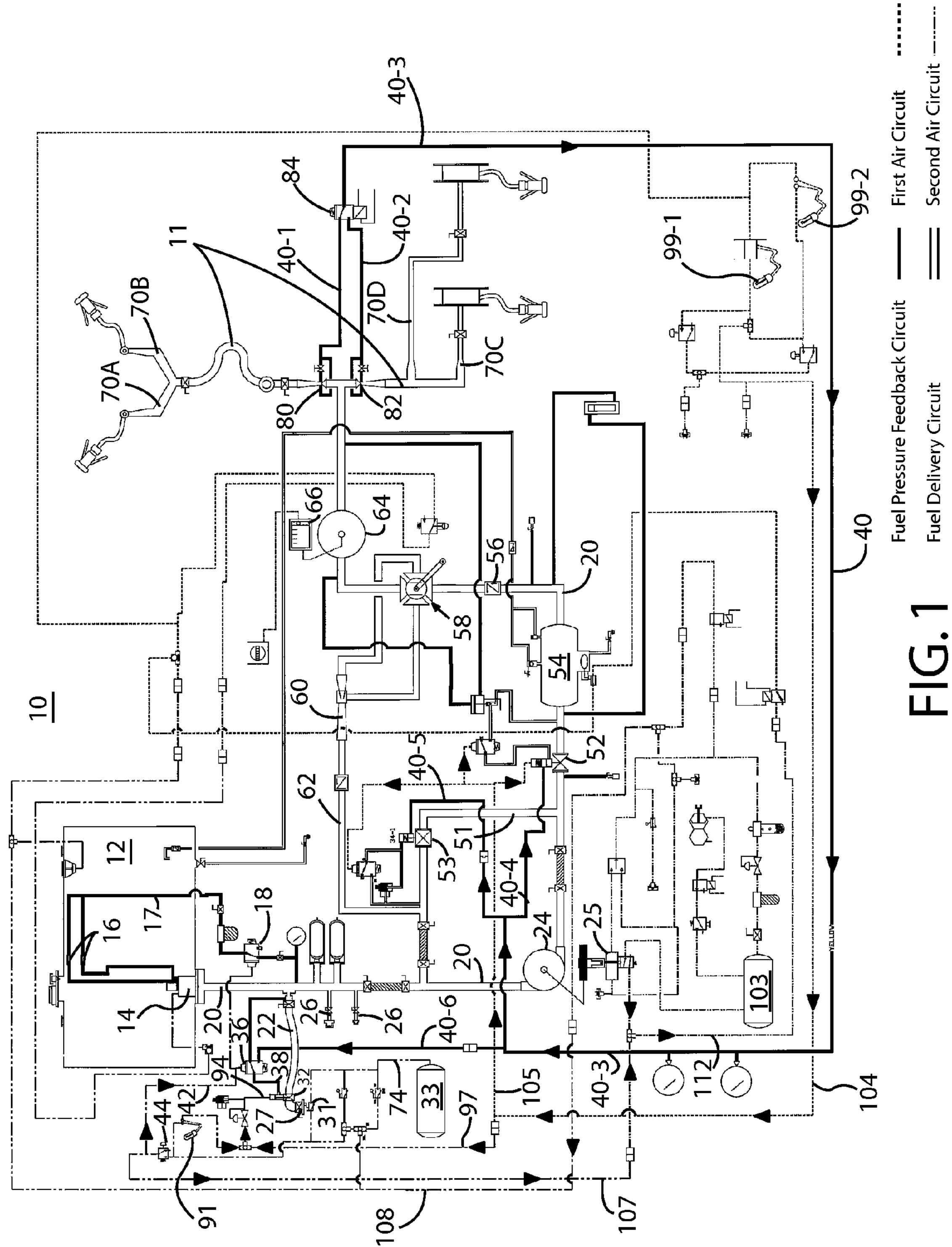
FIG. 1 depicts a schematic illustration of a fuel delivery system according to an exemplary embodiment of the invention.
Figure 2:
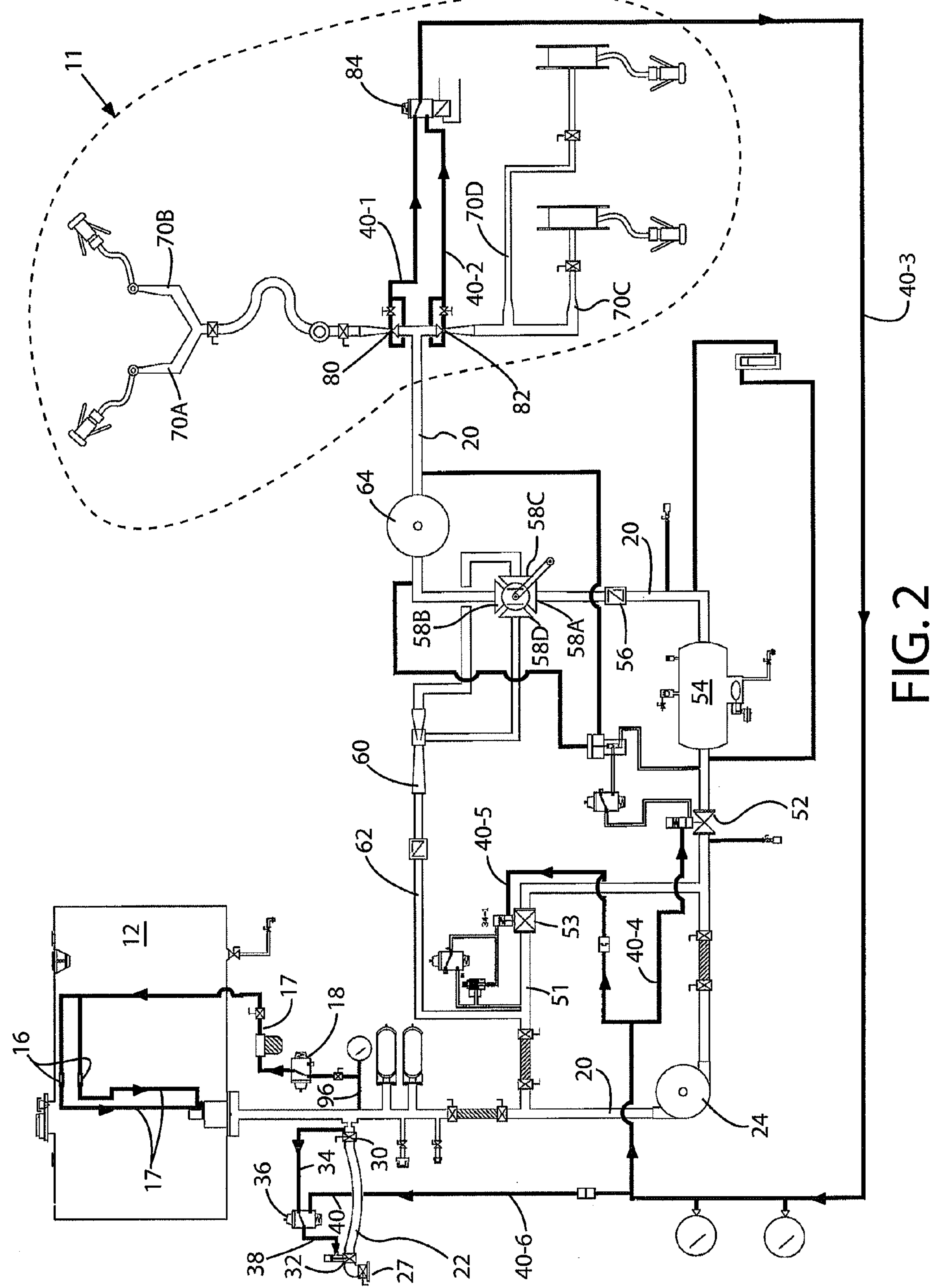
FIG. 2 depicts a fuel pressure feedback circuit of the fuel delivery system of FIG. 1.
Figure 3:
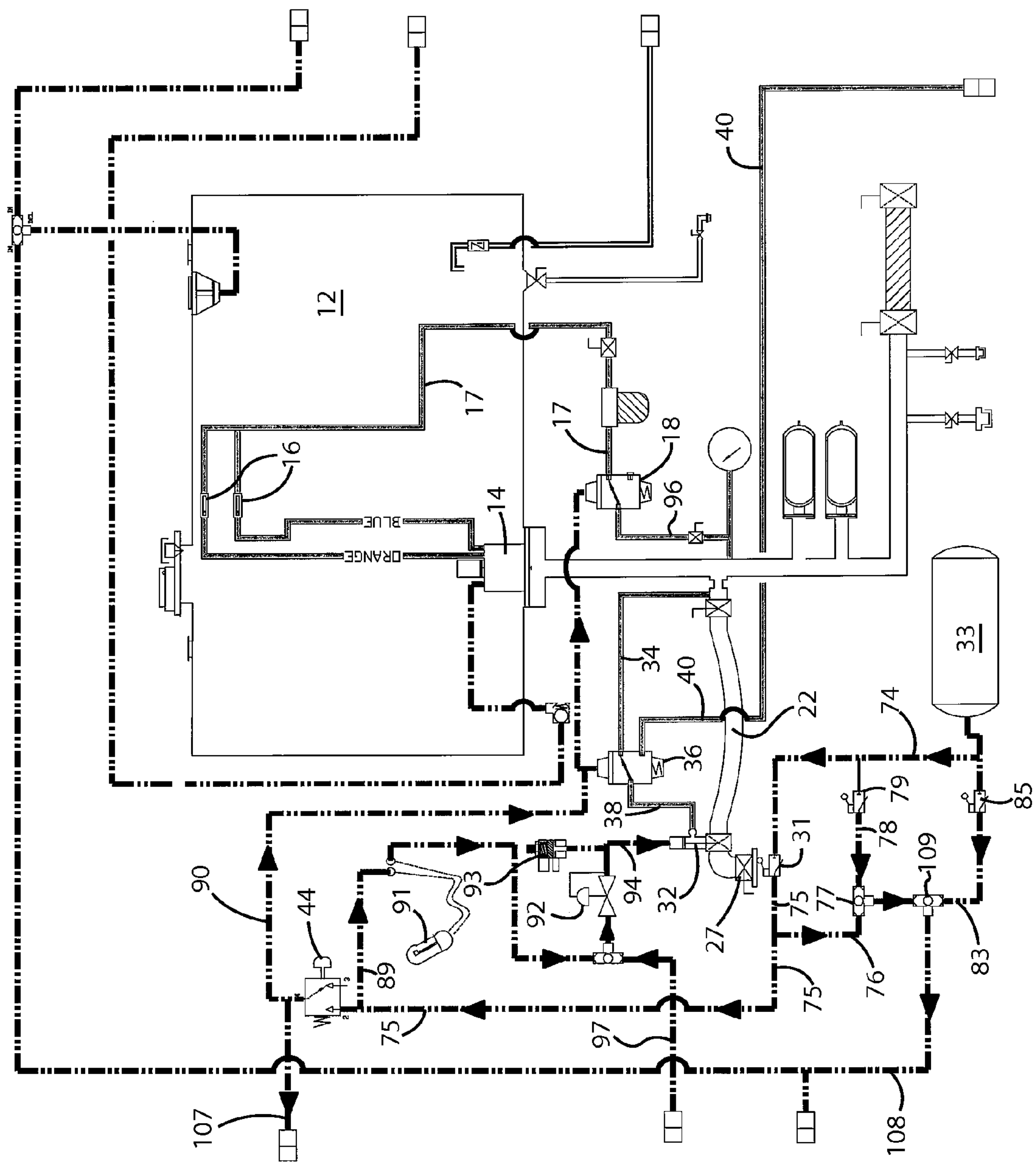
FIG. 3 depicts a compressed air circuit of the fuel delivery system of FIG. 1.

FIG. 1 depicts a schematic illustration of a fuel delivery system 10 of a fuel truck according to an exemplary embodiment of the invention. FIG. 2 depicts the fuel pressure feedback circuits of FIG. 1 and FIG. 3 depicts a compressed air circuit of FIG. 1. The fuel delivery system 10 that is shown in FIGS. 1-3 is configured to perform at least the following functions: (1) direct fuel from a hydrant pit valve (not shown) or other fuel source to a fuel tank of an aircraft (not shown), (2) direct fuel from the hydrant pit valve or other fuel source to an on-board fuel tank 12 of the fuel truck, (3) direct fuel from fuel tank 12 to a fuel tank of an aircraft, and (4) direct fuel from the fuel tank of an aircraft to fuel tank 12. This invention concerns the first two functions of system 10.

As an overview of FIG. 1, fuel delivery system 10 of a fuel truck includes a fuel delivery circuit, a fuel pressure feedback circuit, two compressed air circuits and an electrical circuit that operate together to accomplish the aforementioned functions. System 10 includes a hose 22 and bottom load conduits 26, which are each connectable to a fuel source, such as a hydrant pit valve or a fuel pump at an oil depot filling station, to introduce fuel into a fluid passageway 20 of system 10. Fluid passageway 20 is fluidly connected to a hose system 11 of system 10. Hose system 11 is configured to connect to an aircraft at one or more aircraft fueling points to distribute fuel either to or from the fuel tank of the aircraft. Fluid passageway 20 is also fluidly connected to an on-board fuel tank 12 of system 10, which stores fuel that is delivered from either the fuel source(s) or the aircraft fuel tanks.

Referring now to the components of the fuel delivery circuit of system 10 depicted in FIGS. 1 and 2, hose 22 is configured to be connected to a hydrant pit valve (not shown). One end of hose 22 includes a coupling 27 that is configured to be connected to the hydrant pit valve (not shown). When coupling 27 is not in use, it is stowed away and connected to a three-way interlock 31. Bottom load conduits 26 are each configured to be fluidly coupled to receive fuel from a fuel pump at an oil depot filling station, for example. Hose 22 and bottom load conduits 26 are each fluidly coupled to a fluid passageway 20 to deliver fuel into fluid passageway 20. Gate valve 30 (identified in FIG. 2) is mounted to the end of hose 22 to either permit or prevent the passage of fuel into fluid passageway 20.

On-board fuel tank 12 is fluidly connected to fluid passageway 20. A foot valve 14 is positioned at the bottom end of fuel tank 12. Foot valve 14, which is biased to a closed position, is configured to move between an open position and a closed position. In an open position, foot valve 14 permits the flow of fuel into or out of tank 12; and, in a closed position, foot valve 14 prevents the flow of fuel into or out of tank 12. A suitable foot-level valve is sold and distributed by Whittaker Controls of North Hollywood, Calif. General operation of a foot-level valve should be known to those skilled in the art.

A pump 24 is connected to fluid passageway 20 downstream of tank 12. Pump 24 has an impeller shaft that is releasably connected to a drive shaft of the fuel vehicle. Pump 24 has two modes of operation, i.e., a pump mode and a drive mode. Pump 24 is operated in the pump mode to distribute fuel from tank 12 to the aircraft. In the pump mode, the impeller shaft of pump 24 is connected to the drive shaft of the fuel truck, such that rotation of the drive shaft of the fuel truck rotates the impeller shaft of pump 24. In operation, pump 24 maintains a fuel pressure to convey fuel to the nozzles of hose system 11.

Pump 24 is operated in the drive mode to distribute fuel from hose 22 to the aircraft. In the drive mode, the impeller shaft of pump 24 is disconnected from the input shaft of the fuel truck, such that the impeller shaft is able to spin freely (otherwise known as freewheeling). A shift cylinder 25 (see FIG. 1) is configured to translate the impeller shaft of pump 24 between the connected position (corresponding to the pump mode) and the disconnected position (corresponding to the drive mode).

A deadman control valve 52 is connected to fluid passageway 20 downstream of pump 24 for either permitting or preventing the passage of fuel through fluid passageway 20. Deadman control valve 52 is controlled by deadman controls 99-1 and 99-2. Deadman control valve 52 maintains the fuel pressure at the aircraft fueling nozzles at or below 45 psi. A suitable deadman control valve is sold and distributed by Whittaker Controls of North Hollywood, Calif., USA. General operation of a deadman control valve should be known to those skilled in the art.

A bypass conduit 51 is connected to fluid passageway 20 at a first location that is upstream of pump 24, and a second location that is downstream of pump 24. A valve 53 is fluidly connected to bypass conduit 51. Valve 53 is configured to open when pump 24 is in the pump mode (not the drive mode) and the pressure at the aircraft fueling nozzles exceeds 40 psi. In operation, when the pressure at the aircraft fueling nozzles exceeds 40 psi, valve 53 opens to direct fuel back to the inlet side of pump 24, thereby lowering the pressure downstream of pump 24.

A fuel filter/separator 54 is connected to fluid passageway 20 downstream of deadman control valve 52 for filtering the fuel, removing water, and removing contaminant particles from the fuel. A check valve 56 and a globe valve 58, also referred to as a fuel-defuel valve 58, are both fluidly coupled to fluid passageway 20 downstream of the fuel filter/separator 54.

As best shown in FIG. 2, in a 'fuel' mode of the fuel-defuel valve 58, fuel is transferred from system 10 to the aircraft. Specifically, fuel that is introduced into port 58*a* of four-way valve 58 is distributed through port 58*b* of the valve 58, then through hose system 11, and then to the aircraft. In a 'defuel' mode of the fuel-defuel valve 58, fuel is transferred from the aircraft to the fuel tank 12 of the vehicle. Specifically, fuel is distributed through port 58*a*, then through port 58*c* of valve 58 and then through eductor 60. The flow of fuel through eductor 60 creates suction at port 58*d*, resulting in the siphoning of fuel from the aircraft fuel tank(s) through hose system 11, then through port 58*b* of valve 58, then through port 58*d* of valve 58, then through return fluid passageway 62, then into fluid passageway 20 and then into fuel tank 12. General operation of fuel-defuel valve 58 and eductor 60 are known to those skilled in the art.

A fuel meter 64 is fluidly coupled to fluid passageway 20 downstream of valve 58. The fuel meter 64 includes a visible counter 66 (identified in FIG. 1) that indicates the amount of fuel that flows through fuel meter 64.

Hose system 11 is fluidly coupled to fluid passageway 12 downstream of fuel meter 64. Hose system 11 includes four hoses 70A through 70D. A nozzle at the end of each hose 70 is configured to be connected to a refueling point of an aircraft (or other vehicle) to either transfer fuel either to or from an aircraft fuel tank, depending upon the setting of fuel-defuel valve 58.

Referring now to the components of the first compressed air circuit of system 10 depicted in FIGS. 1 and 3, the first compressed air circuit includes a compressed air tank 33. Compressed air tank 33 distributes compressed air through the first compressed air circuit, as designated by the arrows in FIG. 3. More specifically, compressed air tank 33 delivers compressed air into conduit 74. Conduit 74 is fluidly connected to three-way interlock 31. When coupling 27 is stowed in interlock 31, interlock 31 prevents the passage of air therethrough. When coupling 27 is released from interlock 31, interlock 31 permits the passage of compressed air into conduit 75.

Conduit 75 is fluidly connected to conduit 76 to deliver a stream of compressed air into conduit 76. Conduit 76 is fluidly connected to shuttle valve 77, which conveys air to shuttle valve 109, which conveys air to conduit 108. Three-way interlocks 79 and 85 are fluidly connected to conduits 78 and 83, respectively. Although not explicitly shown, three-way interlocks 79 and 85 are coupled to a valve through conduit 108 that locks the wheel brakes of the fuel truck. In operation, once an operator releases coupling 27 of hose 22 from interlock 31 to deploy hose 22, a compressed air signal travels through conduits 75 and 76, shuttle valves 77 and 109 and into conduit 108. That compressed air signal actuates a valve (not shown), and, once actuated, that valve locks the wheel brakes of the fuel truck to prevent the fuel truck from moving while the operator is deploying the hose 22.

Conduit 75 is fluidly connected to conduit 89 to deliver a stream of compressed air into conduit 89. A deadman control 91 is fluidly connected to conduit 89. Deadman control 91 is essentially a manually-operated valve that is biased to a closed position. In operation, when deadman control 91 is not manually actuated, compressed air is prevented from travelling downstream of control 91 toward regulator 92. When deadman control 91 is manually activated, compressed air is permitted to travel downstream of control 91 into conduit 94. General operation of a deadman control should be known to those skilled in the art.

Conduit 89 is fluidly connected to conduit 94 to deliver a stream of compressed air into conduit 94. A pressure regulator 92 and a relief valve 93 are fluidly connected to conduit 94 to regulate the air pressure in conduit 94. Conduit 94 delivers pressurized air into an air chamber of pressure regulator 32. Pressure regulator 32 generally includes an air chamber that is separated from a fuel chamber by a moveable piston and a valve seat. The piston moves with respect to the valve seat.

The piston of pressure regulator 32 reacts to any differences in pressure between the air pressure in the air chamber, which is delivered by conduits 94 and 97, and the fuel pressure in the fuel chamber, which is delivered by conduit 38. When the fuel pressure exceeds the air pressure, the piston translates, causing the piston to bear on the valve seat thereby closing pressure regulator 32 and preventing the introduction of fuel into system 10 via hose 22. Conversely, when the air pressure exceeds the fuel pressure, the piston is separated from the valve seat thereby maintaining pressure regulator 32 in an open configuration to permit the introduction of fuel into system 10 via hose 22.

Conduit 75 is also fluidly connected to three-way valve 44, which is shown in a closed position in FIGS. 1 and 3. Three-way valve 44 has an open position and a closed position, and may be automated or manually operable. Three-way valve 44 connects conduit 75 with conduits 90 and 107.

In an open position of three way valve 44 (valve 44 is shown in a closed position in FIGS. 1 and 3), valve 44 distributes compressed air to conduit 107 which distributes compressed air to conduit 112. Upon receiving the compressed air stream, conduit 112 conveys compressed air ultimately to deadman controls 99-1 and 99-2. In operation, when neither control 99-1 nor control 99-2 is manually actuated, compressed air is prevented from travelling downstream of controls 99-1 and 99-2. Alternatively, when either control 99-1 or control 99-2 is manually actuated, compressed air is distributed through conduit 104, and into conduits 97 and 105 toward valve 52 and regulator 32, the purpose of which is described in greater detail in the description of the second compressed air circuit of system 10.

In an open position of three way valve 44, valve 44 also distributes compressed air to conduit 90 which distributes compressed air to valves 36 and 18. As best shown in FIG. 3, in a closed position of three-way valve 44, valve 44 prevents the distribution of compressed air to three-way valves 36 and 18. Conduit 90 is positioned to deliver a stream of compressed air to an air chamber of three-way valves 18 and 36.

Three-way valve 36 is configured to transfer fuel from either fuel pressure feedback conduit 40 or fuel pressure feedback conduit 34 to conduit 38, depending upon the position of a spring-loaded diaphragm within valve 36. In operation, delivering a stream of compressed air into the air chamber of valve 36 causes the diaphragm (not shown) of valve 36 to move, consequently altering the fluid passageway through valve 36 to fluidly connect conduit 40 with conduit 38. In the absence of the compressed air stream, the diaphragm of valve 36 returns to its original position in which conduit 34 is fluidly connected with conduit 38 (as shown). A suitable three-way valve is sold and distributed by Versa Valves Corp. of Paramus, N.J., USA. The operation of a three-way valve should be known to those skilled in the art.

Conduit 90 is also positioned to deliver a stream of compressed air to an air chamber of a three-way valve 18. Three-way valve 18 is configured to selectively transfer fuel from feedback conduit 96 to feedback conduit 17, depending upon the position of a spring-loaded diaphragm within valve 18. In operation, delivering a stream of compressed air into the air chamber of valve 18 causes the diaphragm (not shown) of valve 18 to move, consequently altering the fluid passageway through valve 18 and terminating the fluid connection between conduit 96 and conduit 17. In the absence of the compressed air stream, the diaphragm of valve 36 returns to its original position in which conduit 96 is fluidly connected with conduit 17 (as shown).

Referring now to the components of the second compressed air circuit of system 10 depicted primarily in FIG. 1, the second compressed air circuit includes a compressed air tank 103. Compressed air tank 103 delivers compressed air into conduit 104. Two deadman controls 99-1 and 99-2 are coupled to conduit 104 to regulate the delivery of compressed air through conduit 104. In operation, when neither control 99-1 nor control 99-2 is manually actuated, compressed air is prevented from travelling downstream of controls 99-1 and 99-2. Alternatively, when either control 99-1 or control 99-2 is manually actuated, compressed air is distributed through conduit 104, and into conduits 97 and 105 toward valve 52 and regulator 32, as described hereinafter.

Conduit 104 is fluidly coupled to conduit 105, and conduit 105 is fluidly coupled to an air chamber of valve 52. Valve 52 generally includes an air chamber that is separated from a fuel chamber by a moveable piston and a valve seat. The piston of valve 52 reacts to any differences in pressure between the air pressure in the air chamber, which is delivered by conduit 105, and the fuel pressure in the fuel chamber, which is delivered by conduit branch 40-4. When the fuel pressure exceeds the air pressure, the piston translates, causing the piston to bear on the valve seat thereby closing valve 52 and preventing the introduction of fuel through fluid passageway 20 and into hose system 11. Conversely, when the air pressure exceeds the fuel pressure, the piston is separated from the valve seat thereby maintaining valve 52 in an open configuration to permit the delivery of fuel to hose system 11.

Conduit 104 is also fluidly coupled to conduit 97, and conduit 97 is fluidly coupled to an air chamber of regulator 32 via conduit 94. Like conduit 89, conduit 97 is also configured to deliver a stream of compressed air into the air chamber of regulator 32. The piston of pressure regulator 32 reacts to any differences in pressure between the air pressure in the air chamber, which is delivered by conduit 94, and the fuel pressure in the fuel chamber, which is delivered by conduit 38. When the fuel pressure exceeds the air pressure, the piston translates, causing the piston to bear on the valve seat thereby closing pressure regulator 32 and preventing the introduction of fuel into system 10 via hose 22. Conversely, when the air pressure exceeds the fuel pressure, the piston is separated from the valve seat thereby maintaining pressure regulator 32 in an open configuration to permit the introduction of fuel into system 10 via hose 22.

Referring now to the components of the fuel pressure feedback circuits of system 10 depicted in FIGS. 1-3, a first fuel pressure feedback circuit is provided to control the operation of foot valve 14. More particularly, the first fuel pressure feedback circuit includes a feedback conduit 17 and a pair of jet level sensors 16 that are disposed at or near the top end of fuel tank 12. Jet level sensors 16 are each coupled to feedback conduit 17, which is connected to fluid passageway 20. Feedback conduit 17 separates into two distinct branches at a location that is upstream of jet level sensors 16. In operation, each sensor 16 is configured to transmit a pressure signal to foot valve 14, by way of a respective branch of feedback conduit 17, to bias foot valve 14 to an open position. In the absence of a pressure signal transmitted by sensors 16, foot valve 14 remains biased in a closed position. A suitable jet level sensor is sold and distributed by Whittaker Controls of North Hollywood, Calif., USA. General operation of a jet level sensor should be known to those skilled in the art.

A second fuel pressure feedback circuit is provided to maintain a limited fuel pressure within fluid passageway 20 when system 10 is operated in the load mode, i.e., transferring fuel from hose 22 to tank 12. The second fuel pressure feedback circuit includes conduits 34 and 38. In the 'load' mode, valve 44 is closed, and, for reasons already described, three-way valve 36 is configured to transfer fuel from feedback conduit 34 to feedback conduit 38. Conduit 38 delivers the fuel to the fuel chamber of regulator 32. The piston of pressure regulator 32 reacts to any differences in pressure between the air pressure in the air chamber, which is delivered by conduit 94 via conduits 89 and 97, and the fuel pressure in the fuel chamber, which is delivered by conduit 34 via conduit 38. When the fuel pressure exceeds the air pressure, the piston translates, causing the piston to bear on the valve seat thereby closing pressure regulator 32 and preventing the introduction of fuel into system 10 via hose 22. Conversely, when the air pressure exceeds the fuel pressure, the piston is separated from the valve seat, thereby maintaining pressure regulator 32 in an open configuration to permit the introduction of fuel into system 10 via hose 22.

A third fuel pressure feedback circuit is provided to maintain a fuel pressure of 40 psi at the aircraft fueling nozzles of hose system 11 when system 10 is operated in the fuel mode, i.e., transferring fuel from hose 22 to a fueling point on an aircraft, i.e., bypassing on-board fuel tank 12. The third fuel pressure feedback circuit includes a multi-branch feedback conduit 40 which delivers a fuel pressure feedback signal to regulator 32 (via valve 36), valve 52 and valve 53.

As best shown in FIG. 2, feedback conduit 40 includes five separate branches 40-1 through 40-6. Branches 40-1 and 40-2 of conduit 40 extend between venturi selector 84 and venturis 80 and 82, respectively. Venturi 80 is upstream of the nozzles of hoses 70A and 70B, and venturi 82 is upstream of the nozzles of hoses 70C and 70D. Venturis 80 and 82 are calibrated to compensate for the pressure drop resulting from the length of hoses 70A/B and 70C/D, respectively. Accordingly, the fuel pressure signal from venturis 80 and 82 is substantially equal to the fuel pressure at the nozzles of hoses 70A/B and 70C/D, respectively. In other words, the fuel pressure signals that are produced at the venturis 80 and 82 are indicative of the fuel pressures at the nozzles of hoses 70A/B and 70C/D, respectively.

Depending upon the setting of venturi selector 84, venturi selector 84 distributes a fuel pressure signal from either branch 40-1 or branch 40-2 to branch 40-3. Branch 40-3 of conduit 40 delivers the fuel pressure signal to branches 40-4, 40-5 and 40-6. Branch 40-4 of conduit 40 delivers the fuel pressure signal to a fuel chamber of valve 52. Branch 40-5 of conduit 40 delivers the fuel pressure signal to a fuel chamber of valve 53. Branch 40-6 of conduit 40 delivers the fuel pressure signal to the fuel chamber of regulator 32 (via valve 36).

Valve 52 and regulator 32 each include a piston that reacts to any differences in pressure between the air pressure in the air chamber, which is delivered by conduits 105 and 94 (see FIG. 3), and the fuel pressure in the fuel chamber, which is delivered by conduit 40-4 and conduit 38 (via conduit 40-6), respectively, to maintain the fuel pressure at the nozzles of hose system 11 at approximately 40 psi. In the event that regulator 32 fails for any reason, deadman valve 52 will prevent the fuel pressure within system 10 from exceeding 45 psi.

Referring now to an exemplary method of delivering fuel from hydrant pit valve to on-board fuel tank 12, which is also referred to herein as the load mode, an operator first performs the following steps: disconnect coupling 27 from 3-way interlock 31, connect coupling 27 to the hydrant pit valve, and close valve 44 (shown in a closed position). Disconnecting coupling 27 from three-way interlock 31 causes compressed air from tank 33 to travel from conduit 74 into conduit 75, then into conduit 76, and then into conduit 108. The compressed air stream activates a valve, consequently locking the brakes of the fuel truck to prevent the truck from moving. The stream of compressed air also travels from conduit 75 into conduit 89 until it reaches deadman control 91.

The operator then squeezes deadman control 91 to distribute the compressed air stream along conduit 89 though air regulator 92, into conduit 94 and into an air chamber of regulator 32, thereby opening regulator 32. The operator then opens the hydrant pit valve to distribute fuel into hose 22. The fuel pressure of the fuel that is distributed from hydrant pit valve will vary and may be as high as 200 psi, for example. The fuel stream travels past regulator 32 through hose 22, into fluid passageway 20, and into feedback conduits 34 and 96. Deadman valve 52, which is biased to a closed position, prevents the fuel from travelling downstream of valve 52 toward hose section 11.

The fuel stream enters feedback conduit 96, passes through valve 18 into conduit 17, and travels through jet level sensors 16. Assuming that jet level sensors 16 are above the level of fuel within tank 12 (i.e., not immersed in fuel), jet level sensors 16 distribute a fuel stream to foot valve 14, which causes foot valve 14 to open. Once foot valve 14 opens, fuel from fluid passageway 20 travels upward into fuel tank 12.

As fuel is distributed into tank 12, the fuel stream enters conduit 34, passes through valve 36 and enters feedback conduit 38. Fuel is distributed into the fuel chamber of regulator 32 via conduit 38. The regulator 32 regulates the flow of fuel in hose 22 and fluid passageway 20 to approximately 40 psi (or any other desired pressure value).

Once the level of fuel rises to the top of tank 12 and submerges jet level sensors 16, jet level sensors 16 cease to distribute a fuel stream to foot valve 14, which causes foot valve 14 to return to its closed position, thereby preventing the further introduction of fuel into tank 12. Thereafter, the fuel pressure in regulator 32 (which is transmitted by conduit 38) quickly exceeds the air pressure (which is transmitted by conduit 94) and regulator 32 closes, thereby preventing the introduction of fuel into hose 22. Alternatively, if/once the operator deactivates deadman control 91, air is no longer delivered to regulator 32 and the fuel pressure in regulator 32 quickly exceeds the air pressure, thereby causing regulator 32 to close and prevent the introduction of fuel into hose 22.

Referring now to an exemplary method of delivering fuel from hydrant pit valve to hose system 11 directly into a refueling point on an aircraft (i.e., bypassing fuel tank 12), which is also referred to herein as the fuel mode, an operator first performs the following operations: set fuel-defuel valve 58 to a fuel mode, open valve 44, disconnect coupling 27 from three-way interlock 31, connect coupling 27 to the hydrant pit valve, and connect one or more nozzles of hose system 11 to refueling point(s) on an aircraft.

Like the first exemplary method already described, disconnecting coupling 27 from three-way interlock 31 causes compressed air from tank 33 to travel from conduit 74 into conduit 75, then into conduit 76, and then into conduit 108. The compressed air stream activates a valve, consequently locking the brakes of the fuel truck to prevent the truck from moving.

The stream of compressed air travels through open valve 44 into conduits 90 and 107. The compressed air stream travels through conduit 90 and into the air chambers of valves 36 and 18. Distributing air into the air chamber of valve 36 creates a fluid passageway in valve 36 between conduit 38 and conduit 40. Distributing air into the air chamber of valve 18 closes the fluid passageway in valve 18 between conduit 96 and conduit 17. Because fuel is prevented from being distributed through conduit 17 and jet stream sensors 16, foot valve 14 remains biased in its closed position, thereby preventing the introduction of fuel into and out of tank 12.

The compressed air stream also travels through open valve 44 into conduit 107 into conduit 112 and into deadman controls 99-1 and 99-2. Distributing air from conduit 107 allows the pump to remain in drive mode which allows the impeller shaft of pump 24 to remain disengaged from the input shaft from the fuel truck transmission, such that the impeller shaft is able to spin freely (otherwise known as freewheeling).

The operator then opens the hydrant pit valve to distribute fuel into hose 22. The operator then actuates deadman control 99-1 or 99-2 to distribute a compressed air stream along conduit 104 to conduits 97 and 105. The compressed air stream travels through conduit 97 to the air chamber of regulator 32, via conduit 94. The compressed air stream also travels through conduit 105 to the air chamber of valve 52. Delivering compressed air to the air chambers of regulator 32 and valve 52 causes them to open.

Once regulator 32 is open, fuel from the hydrant pit valve is introduced into hose 22. The fuel stream travels through hose 22 and into fluid passageway 20. The pressurized fuel stream rotates the impeller of pump 24, which spins freely (otherwise known as freewheeling) because the drive shaft of the truck is disconnected from the impeller of pump 24. The fuel stream is then delivered through the nozzles of hose system 11 and to a fueling point on an aircraft.

While fuel is distributed through one or more of hoses 70A-70D, fuel passes through venturis 80 and/or 82, depending upon which hose is selected by the operator. As noted previously, venturis 80 and 82 are calibrated to compensate for the pressure drop resulting from the length of hoses 70A/B and 70C/D, respectively. A fuel pressure feedback stream is transmitted from venturis 80 and 82 through conduit branches 40-1 or 40-2, to conduit branch 40-3, to conduit branch 40-6, and into the fuel chamber of regulator 32. Another fuel pressure feedback stream is transmitted from venturis 80 and 82 through conduit branches 40-1 or 40-2, to conduit branch 40-3, to conduit branch 40-4 to conduit 38, and into the fuel pressure feedback chamber of valve 52.

Once the fuel pressure in regulator 32, which is transmitted by conduit 38 via conduit branch 40-6, exceeds the air pressure, which is transmitted by conduit 94 via 97, regulator 32 closes to prevent the introduction of fuel into hose 22. Alternatively, if/once the operator deactivates deadman control 99-1 or 99-2, air is no longer delivered to regulator 32 and the fuel pressure in regulator 32 quickly exceeds the air pressure causing regulator 32 to close, thereby preventing the introduction of fuel into hose 22. Also, once the operator deactivates deadman control 99-1 or 99-2, air is no longer delivered to valve 52 and the fuel pressure in valve 52 quickly exceeds the air pressure and valve 52 closes, thereby preventing fuel passage in conduit 20 downstream of valve 52. In the event that regulator 32 fails for any reason, deadman valve 52 prevents the fuel pressure at the aircraft fueling nozzles from exceeding 45 psi.

Although the invention is illustrated and described herein with reference to specific embodiments, the invention is not intended to be limited to the details shown. Rather, various modifications may be made in the details within the scope and range of equivalents of the claims and without departing from the spirit of the invention. It will further be appreciated that the fuel delivery system is not limited to fuel and may be used with any type of fluid. The fuel delivery system is also not limited to any specific fluid pressures.

What is claimed:

1. A fuel delivery system of an aircraft refueling vehicle that is configured to distribute fuel from a hydrant pit valve at an airport, said fuel delivery system comprising:

- a first hose including a coupler that is configured to be fluidly connected to a hydrant pit valve at an airport to receive fuel from the hydrant pit valve;
- a fuel passageway that is fluidly coupled to the first hose;
- an on-board fuel tank that is fluidly coupled to the fuel passageway;
- a second hose that is fluidly coupled to the fuel passageway, said second hose including a nozzle that is configured to be coupled to a refueling point on an aircraft to distribute fuel into a fuel tank of an aircraft;
- a valve coupled to the fuel passageway that is moveable between a first position and a second position, wherein, in the first position of the valve, the fuel passageway is configured to distribute fuel from the first hose to the on-board fuel tank of the aircraft refueling vehicle, and, in the second position of the valve, the fuel passageway is configured to distribute fuel from the first hose to the second hose of the aircraft refueling vehicle;
- a pressure regulator for regulating a fuel pressure within the fuel delivery system, wherein the pressure regulator includes an air chamber and a sgparate fuel chamber,
- wherein when an air pressure in the air chamber exceeds a fuel pressure in the fuel chamber of the pressure regulator, the regulator is biased to an open position, and when the fuel pressure in the fuel chamber exceeds the air pressure in the air chamber of the pressure regulator, the regulator is biased to a closed position to prevent the introduction of fuel into the first hose;
- a fuel pressure feedback circuit including a conduit for delivering fuel from the first hose or the fluid passageway to the fuel chamber of thepressure regulator; and
- a compressed air circuit including a compressed air source and a conduit for delivering compressed air from the compressed air source to the air chamber of the pressure regulator.

2. The fuel delivery system of claim 1 further comprising:
a fuel pressure feedback circuit including a conduit for delivering fuel from a point on the second hose to the fuel chamber of the pressure regulator.

3. The fuel delivery system of claim 2 further comprising a venturi fluidly coupled to the second hose that is configured to simulate a fuel pressure at the nozzle of the second hose, and wherein the conduit of the fuel pressure feedback circuit is configured to deliver fuel from the venturi to the fuel chamber of the pressure regulator.

4. The fuel delivery system of claim 1 further comprising a valve positioned on the on-board fuel tank that is movable between an open position and a closed position, wherein, in an open position of the fuel tank valve, fuel is permitted to pass into or out of the on-board fuel tank, and, in a closed position of the fuel tank valve, fuel is prevented from passing into or out of the on-board fuel tank.

5. The fuel delivery system of claim 4 further comprising a fuel pressure feedback circuit including a conduit for delivering fuel from the fuel passageway to the fuel tank valve via a fuel pressure feedback circuit valve, wherein, in an open position of the fuel pressure feedback circuit valve, the fuel pressure feedback circuit valve is configured to distribute fuel to the fuel tank valve to move the fuel tank valve from a closed position to an open position.

6. The fuel delivery system of claim 5 further comprising a compressed air circuit including a compressed air source and a conduit for delivering compressed air from the compressed air source to the fuel pressure feedback circuit valve to open the fuel pressure feedback circuit valve,
wherein, upon delivering compressed air to the fuel pressure feedback circuit valve, the fuel feed back circuit is configured to distribute fuel along the fuel pressure feedback circuit to the fuel tank valve to open the fuel tank valve.

7. A method of operating a fuel delivery system of an aircraft refueling vehicle to distribute fuel from a hydrant pit valve at an airport to either an on-board fuel tank of the aircraft refueling vehicle or to a fuel tank of an aircraft, said method comprising the steps of:
fluidly connecting a first hose of the vehicle to the hydrant pit valve to receive fuel from the hydrant pit valve and deliver the fuel into a fuel passageway of the fuel delivery system;
selectively configuring a fuel passageway of the fuel delivery system to distribute fuel from the fuel passageway to either the on-board fuel tank of the aircraft refueling vehicle or to a second hose of the fuel delivery system that is fluidly connected to a refueling point on the aircraft; and
distributing fuel from the hydrant pit valve into the first hose of the vehicle, and, depending upon the selected configuration of the fuel passageway of the fuel delivery system, distributing the fuel to either the on-board fuel tank of the aircraft refueling vehicle or to the second hose that is connected to the refueling point of the aircraft;
wherein in the selected configured of distributing the fuel to the on-board fuel tank, the selectively configuring step comprises biasing a valve to distribute fuel from the fuel passageway into the on-board fuel tank, and
biasing a valve to prevent the fuel from being distributed out of the second hose.

8. The method of claim 7, wherein in the selected configuration of distributing the fuel to the second hose, the selectively configuring step comprises biasing a valve to distribute fuel from the fuel passageway to the second hose.

9. The method of claim 8, wherein the selectively configuring step further comprises biasing a valve to prevent the fuel from being distributed into the on-board fuel tank.

10. The method of claim 7, further comprising the steps of:
distributing fuel from the first hose, the second hose or the fuel passageway through a fuel pressure feedback circuit to a fuel chamber of a pressure regulator; and
distributing compressed air from a compressed air source to an air chamber of the pressure regulator, wherein when an air pressure in the air chamber exceeds a fuel pressure in the fuel chamber of the pressure regulator, the regulator is biased to an open position, and when the fuel pressure in the fuel chamber exceeds the air pressure in the air chamber of the pressure regulator, the regulator is biased to a closed position to prevent the introduction of fuel into the first hose.

11. A fuel delivery system of an aircraft refueling vehicle that is configured to distribute fuel from a hydrant pit valve at an airport, said fuel delivery system comprising:
a first hose including a coupler that is configured to be fluidly connected to a hydrant pit valve at an airport to receive fuel from the hydrant pit valve;
a fuel passageway that is fluidly coupled to the first hose;
an on-board fuel tank residing on the aircraft refueling vehicle that is fluidly coupled to the fuel passageway;
a second hose that is fluidly coupled to the fuel passageway, said second hose including a nozzle that is configured to be coupled to a refueling point on an aircraft to distribute fuel into a fuel tank of an aircraft; and
a valve coupled to the fuel passageway that is moveable between a first position and a second position,
wherein, in the first position of the valve, the fuel passageway is configured to distribute fuel directly from the first hose to the on-board fuel tank of the aircraft refueling vehicle and to prevent any fuel from entering the second hose, and, in the second position of the valve, the fuel passageway is configured to distribute fuel directly from the first hose to the second hose of the aircraft refueling vehicle.

12. The fuel delivery system of claim 11 further comprising a pressure regulator for regulating a fuel pressure within the fuel delivery system, wherein the pressure regulator includes an air chamber and a separate fuel chamber,
wherein when an air pressure in the air chamber exceeds a fuel pressure in the fuel chamber of the pressure regulator, the regulator is biased to an open position, and when the fuel pressure in the fuel chamber exceeds the air pressure in the air chamber of the pressure regulator, the regulator is biased to a closed position to prevent the introduction of fuel into the first hose.

13. The fuel delivery system of claim 12 further comprising:
a fuel pressure feedback circuit including a conduit for delivering fuel from the first hose or the fluid passageway to the fuel chamber of the pressure regulator; and
a compressed air circuit including a compressed air source and a conduit for delivering compressed air from the compressed air source to the air chamber of the pressure regulator.

14. The fuel delivery system of claim 12 further comprising:
a fuel pressure feedback circuit including a conduit for delivering fuel from a point on the second hose to the fuel chamber of the pressure regulator; and a compressed air circuit including a compressed air source and a conduit for delivering compressed air from the compressed air source to the air chamber of the pressure regulator.

* * * * *